Aug. 10, 1943.  A. F. ARTHUR  2,326,115
POTATO DRYING APPARATUS
Filed Dec. 16, 1940     3 Sheets-Sheet 1
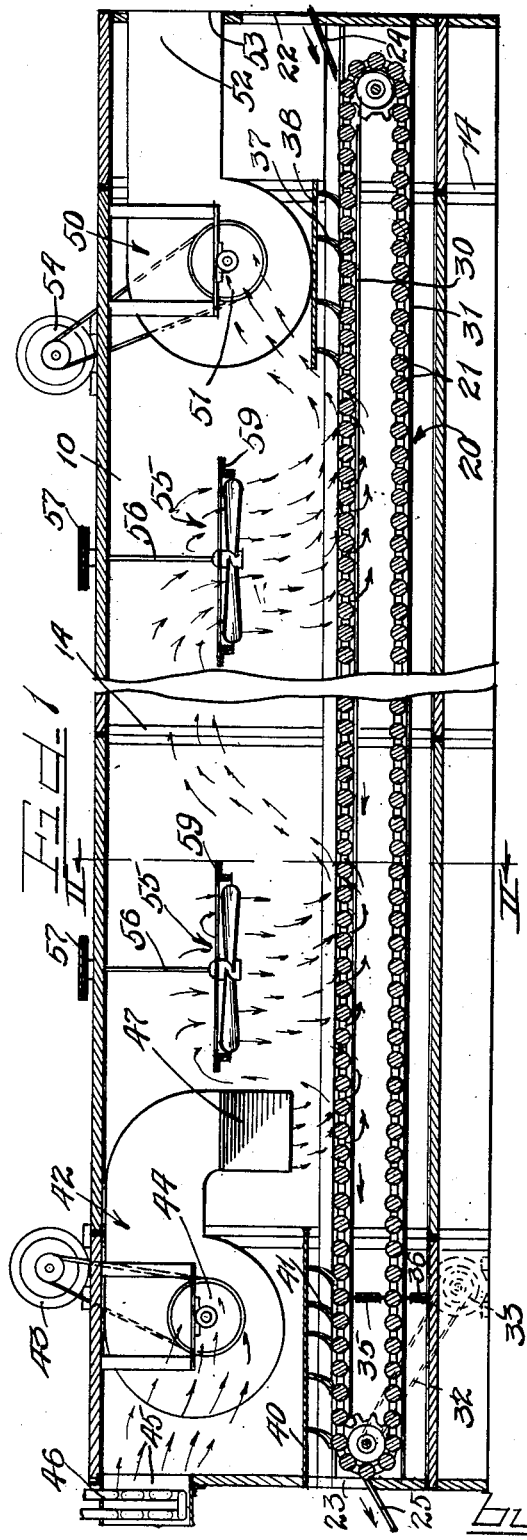
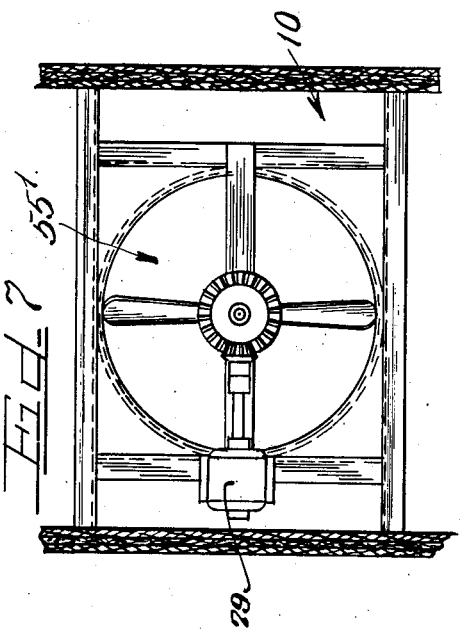
Inventor
Alexander F. Arthur

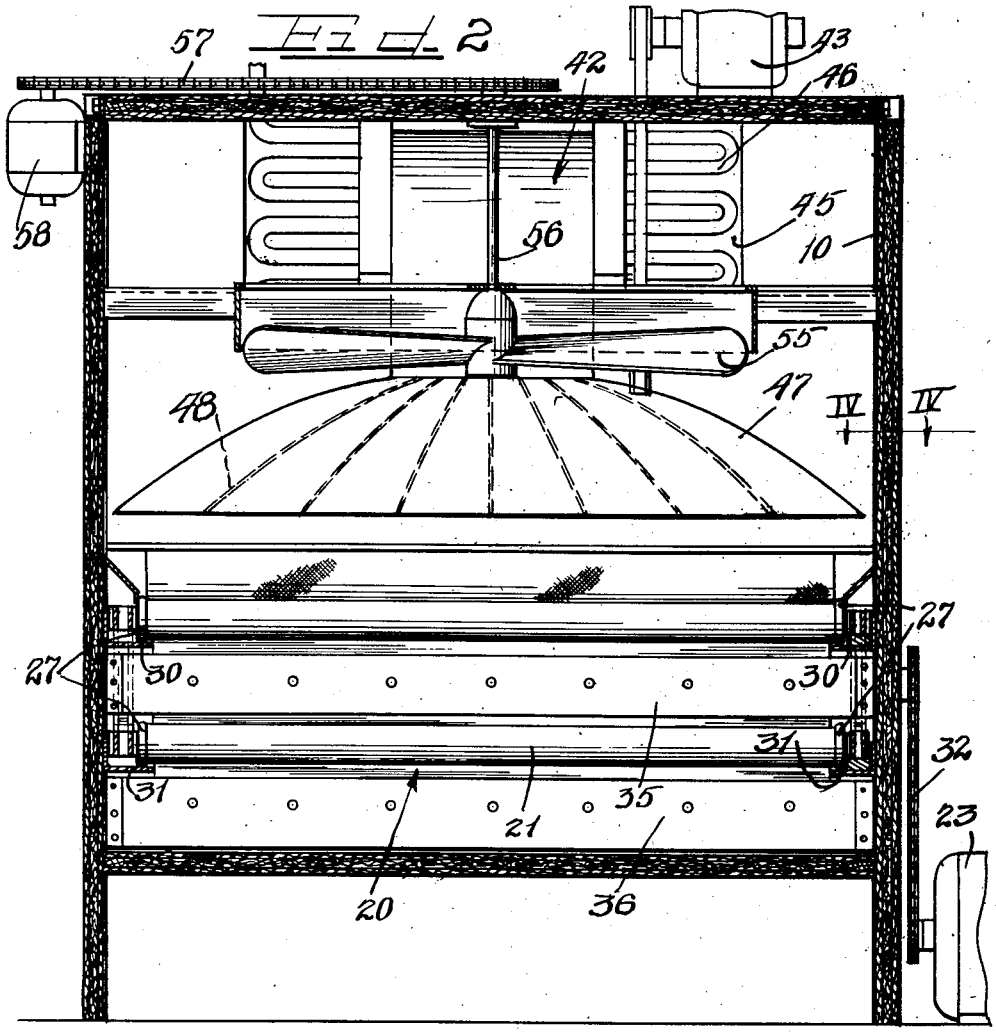
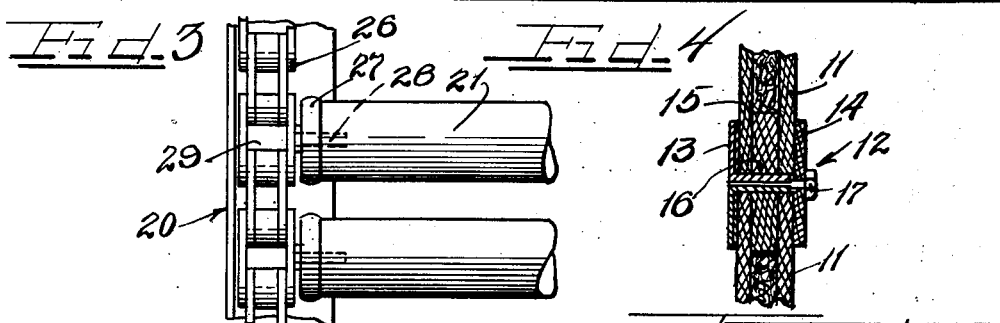

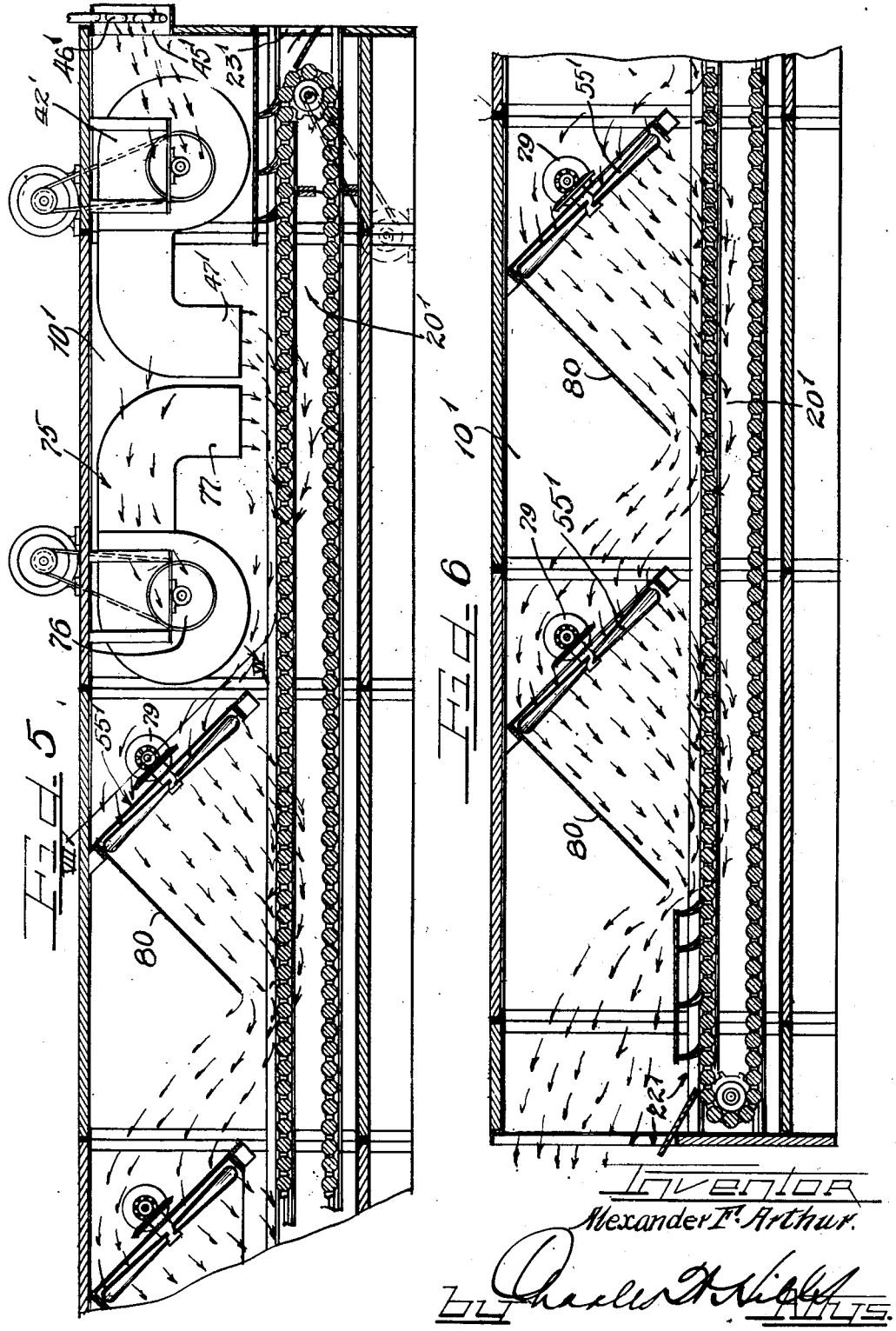

Patented Aug. 10, 1943

2,326,115

UNITED STATES PATENT OFFICE 2,326,115

POTATO DRYING APPARATUS

Alexander F. Arthur, Homestead, Fla., assignor, by mesne assignments, to Frederick C. Peters, Miami Beach, Fla.

Application December 16, 1940, Serial No. 370,304

3 Claims. (Cl. 34—226)

This invention relates to the treating of raw edibles, such as raw potatoes, to preserve them during shipment and storage, and more particularly to render them resistant to the formation of soft rot due to the presence of the organism *Bacillus carotovous*.

More specifically, this invention relates to an apparatus for practicing the process disclosed and claimed in my copending application Serial No. 347,139, entitled "Process of treating potatoes for shipment," filed July 24, 1940, now United States Patent No. 2,228,192 issued January 7, 1941, the latter being a division of and is a continuation of the subject matter of my pending application Serial No. 326,618, filed March 29, 1940, entitled "Method of and apparatus for treating potatoes for shipment."

In the past packers of vegetables such as potatoes have experienced relatively great loss in the transportation of such edibles due to the development of bacterial soft rot. It has been definitely ascertained that this decay is occasioned by the organism *Bacillus carotovous*, and that the development of this motile bacteria is favored by the presence of free moisture on the skin of the edible commodity.

Heretofore many attempts have been made to effect removal of this moisture by various treatments of the product, but these treatments prior to the applicant's process were not found to be practical or at least were never commercialized.

Packers have in the past used both heating and cooling of the product in an endeavor to preserve the same. Heating, however, was as a general rule not considered feasible on account of the fact that it was believed that in order to heat the product to an extent sufficient to effect the desired result, the body of the edible part of the potato would in reality have to be partially cooked.

From experimentation and actual practice I have determined that it is feasible to submit potatoes to a relatively high degree of heat such as 150° F., which is sufficient to remove deleterious growth forming organisms in the potatoes and yet at the same time not result in the cooking of the main body of starchy or meaty cells. At most, my process only affects the outer layer of cells or periderm of the potato and has substantially no effect upon the large body of starch cells known as the "Parenchyma." From microscopic tests made of potatoes treated in accordance with my invention it has been definitely determined that not only are the outer cells of the potatoes dried but the so-called "periderm" cells are supplemented by a number of additional cells occasioned by a biological change in the potato as a result of its being processed with my heating and drying apparatus.

An object of this invention is to provide a way of so treating raw edibles such as potatoes that the product may be rendered substantially free from the development of soft rot during shipment and whereby the product may be preserved for a relatively long period of time after packing without the same becoming spoiled.

In accordance with the features of this invention, I have provided an apparatus for practicing my novel process which apparatus includes a heating chamber having an inlet and outlet for edibles, between which the edibles, such as potatoes, are conveyed in the chamber, and means for forcing heated air through the chamber in an opposite direction to the travel of the edibles in the chamber, this forcing means being, at spaced intervals in the chamber, supplemented by fans for interrupting the flow of air causing it to move in a serpentine or tortuous path, so that the heated air is forced out of its normal horizontal path and against the edibles on the conveying means.

Another feature of the invention relates to the arrangement of the air blowing means so that its nozzle is flared over substantially the full width of the conveying means.

A still further feature of the invention relates to the inclination of the fan means relative to the conveying means, as well as to the provision of baffle means for cooperation with the fan means in the directing of the flow of air at regular intervals in an inclined direction downwardly toward and against the conveyor and the edibles thereon.

Another feature of the invention relates to the breaking up of the heated air current into short spaced sections in which the air is, at the spaced sections, concentrated in a downward direction against the edibles on the longitudinal conveyor.

Other objects and features of this invention will more fully appear from the following detailed description taken in connection with the accompanying drawings, which illustrate several embodiments thereof, and in which:

Figure 1 is a fragmentary vertical cross sectional view taken through a potato drier of my invention;

Figure 2 is an enlarged fragmentary cross sectional view taken on the line II—II of Figure 1 looking in the direction indicated by the arrows;

Figure 3 is a fragmentary detailed view illustrating the manner in which the rollers are connected to the traveling chains of the conveyor;

Figure 4 is an enlarged fragmentary cross sectional view taken on the line IV—IV of Figure 2 looking downwardly and showing the manner in which the side panels of the heating chamber are connected together;

Fig. 5 is a frgamentary vertical sectional view taken through the discharge end of a modified form of potato drier;

Figure 6 is a vertical fragmentary sectional view taken through the potato inlet end of the modified form of drier illustrated in part in Figure 5; and Figure 7 is an enlarged fragmentary plan view, partly in section, taken on the line VII—VII of Figure 5 looking downwardly and showing the top of the fan construction.

The reference character 10 designates generally an elongated tunnel-like heating chamber which preferably has insulated walls so as to be efficient in operation. The side walls of this chamber 10, as shown in Figure 4, may be made up of a plurality of aligned panels 11 connected together at intervals by a joint construction designated generally by the reference character 12. In this joint the adjoining edges of adjoining panels 11—11 are clamped between plates 13 and 14, the former of which (namely, plate 13) is disposed on the outer side of the chamber wall and has disposed under it a layer of insulating material 15. The plate 13 also has an extension 16 extending between the adjoining edges of the two clamped panels 11—11 to which the plate 14 is secured by means of a clamping bolt arrangement 17. Thus, the side panels 11—11 are easily assembled and clamped together and may be likewise easily disassembled when it is desired to break down the heating device for shipment or otherwise.

The tunnel-like chamber may be of any suitable length according to the purpose to which it is put, although I have obtained excellent results by making it 48 feet long by 75½ inches wide inside. Each of the panels 11 in this construction are approximately 8 feet 2 inches in length, although the end panels are of a lesser length. The inside of the tunnel-like chamber that I have constructed and operated is 65 inches high. The bottom of the chamber may be slightly spaced above the floor, such, for example, as 13 inches.

Positioned within the heating chamber 10 and extending substantially from one end of the chamber to the other, as shown in Figure 1, is an endless conveyor 20 which is made up of a plurality of transverse rollers 21 which may be made of any suitable material, such, for example, as wood or metal. This conveyor 20 extends substantially the full length of the heating chamber 10—or, in other words, from the potato inlet 22 to the potato discharge opening 23. At the opening 22, there is provided a delivery board 24 for guiding the edibles or potatoes downwardly onto the forward end of the conveyor. Similarly, at the discharge opening 23, there is provided a feed board 25 for feeding the potatoes away from the conveyor as they are discharged therefrom.

The conveyor 20, in addition to the parallel transverse rollers 21, includes a plurality of endless longitudinally extending chains 26 to which the ends of the spaced rollers 21 are fastened, as shown in Figure 3. Each of the rollers 21 is capped at 27 and is rotatably carried by a journal pin 28 extending endwise therefrom and attached at 29 to a link of the chain. The pin 28 in reality fits detachably in an end opening in the roller 21 and cap 27 so that the roller is rotatable on the pin. In other words, each of the rollers is adapted to roll about its longitudinal axis as the conveyor is actuated.

As shown in Figure 1, in order to effect the rolling of the rollers 21, there is provided below the rollers upper and lower sets of rails 30 and 31 (Figure 2). As shown in Figure 2, the capped ends 27 are adapted to engage these rails 30—30 and 31—31, so that the rollers are turned on the pins 28 as the conveyor is actuated. The conveyor may be operated by any suitable mechanism, such, for example, as a chain drive 32 connected to a suitable motor 33 shown in Figure 1.

The two pairs of rails 30—30 and 31—31, as shown in Figure 2, are suitably supported within the heating chamber 10 with the capped ends 27 of the rollers 21 bearing thereon.

Both the upper and lower legs of the endless conveyor are adapted to have the rollers thereof wiped by means of suitable rubber block wipers 35 and 36 extending transversely of the conveyor, as shown in Figure 1, and suitably supported within the chamber 10. These rubber wipers may be of any suitable construction, and also serve as an air sealing means.

Also, as noted from Figure 1, the potatoes or edibles upon entry in the chamber 10 through the inlet 22 gravitate upon the upper leg of the endless conveyor 20 and are then wiped by a plurality of air sealing mops 37 which engage both the rollers and the potatoes thereon. These mops 37 depend from and are carried by a board 38 suitably carried in a transverse position with the chamber 10.

Similarly, at the discharge end of the chamber, there is provided a mop board 40 which has depending therefrom a plurality of mops 41 for engaging the rollers and the edibles on the rollers. The purpose of these mops is to mop up any excessive moisture and particularly such moisture as might adhere to the surfaces of the rollers 21, as well as to serve as air seals.

In accordance with my invention, heated air is forced through the heating chamber in a longitudinal direction opposite to that of the travel of the potatoes or edibles through the chamber. In order to effect this forced air flow, there is provided at the discharge end of the chamber a blower 42 of any suitable construction and operated by a suitable drive from an electric motor 43. This blower has an inlet opening 44 through which air is drawn, as shown by the arrows, in the left hand end of Figure 1. This air is drawn through an air opening 45 in the chamber in which there is provided suitable heating coils 46 for heating the air as it is drawn into the chamber and into the blower 42.

The blower 42 has a downwardly extending substantially vertical discharge mouthpiece 47 which directs air directly onto the top of the rollers and the edibles thereon. This mouthpiece 47, as shown in Figure 2, extends substantially the width of the chamber and is internally ribbed at 48. It will also be noted that the mouthpiece 47 is curved or flared so as to facilitate the directing of the heated air blasts onto the top of the endless conveyor. Thus, heated air is positively blown or impelled against the discharge side of the endless conveyor and onto the edibles just prior to their passing out of the heating chamber. This results in the potatoes being subjected to the greatest heat just prior to their discharge and after a substantial amount of moisture has been evaporated from their outer cells as will be described hereinafter.

In order to further augment the forcing of the heated air stream through the chamber 10, I have provided at the potato inlet end of the chamber 10 a second blower 50 which has an air inlet 51 and a discharge nozzle 52 leading to the outside of the heating chamber. This discharge nozzle 52 discharges through an opening 53 at the extreme end of the potato inlet side of the conveyor. The blower 50 is suitably driven by an electric motor 54.

This blower 50 acts upon the air stream in the chamber 10 by drawing the air stream outwardly through the inlet 51 of the blower and thereafter through the discharge nozzle 52.

With a view of making the air current still more effective in its drying action of the potatoes or edibles being moved through the chamber by the conveyor 20, I have provided the chamber at spaced intervals with a plurality of fans 55 which are identical in construction, and hence a description of one will suffice for all. Each of these fans 55 extends horizontally and is mounted on a vertically extending rotatable shaft 56 suitably driven by a chain drive 57 from an electric motor 58 (Figures 1 and 2). Also, each of these fans 55 is disposed in an annular cage 59 mounted on the shaft 56.

As shown in Figure 1, these fans operate to direct or impell the heated air forcibly against the top of the conveyor 20 and the edibles thereon. Thus, as shown by the lines of arrows in Figure 1, the heated air blast is in reality caused to travel a more or less tortuous or serpentine path through the heating chamber. This arrangement results in the air not only traveling over the top of the potatoes but also downwardly through the conveyor so that the potatoes are subjected to the heated air on all sides as they roll along.

In actual practice, I have found that if the heated air has an incoming temperature of 145° to 150°, it loses approximately 45° to 50° in temperature during its travel through the heating chamber 10. In other words, if the heated air has a temperature of 145° F. at the nozzle 47, it will have lost between 45° and 50° by the time it reaches the discharge nozzle 52 of the blower 50.

I have also found that desirable results are obtained by so timing the conveyor 20 that the potatoes are in the heating chamber for a period of time less than ten minutes or somewhere in the neighborhood of two to five minutes.

As a result of the use of my process, it has been determined that potatoes treated in accordance therewith will during their course of travel through the heating chamber 10 lose approximately one-half pound of water per bushel of potatoes.

I have also ascertained by histological tests that, due to the fact that not only is moisture removed from the outer layers of each potato but in addition thereto these cells are subjected to maximum heat just prior to the potatoes leaving the chamber 10, the outer cells of the potato undergo a biological change. This biological change is of such character that the layers of periderm cells adjacent the outer surface of the potato are caused to be augmented by a number of additional layers of cells which I have found to be in cases that I have had tested as much as two or more layers. It will, of course, be appreciated that the periderm cells of the potato are substantially starch free, so that the soft rot organism in order to have access to the starchy cells or cortical parenchyma must travel through two additional layers of cells in potatoes treated by my invention before reaching the starch cells upon which this organism depends for sustenance. Then, too, the removal of moisture from the outer cells deprives these deleterious organisms of their means of movement, since these organisms are motile and depend upon moisture in order to move about. Thus, potatoes treated by my novel apparatus in accordance with the process of my invention are rendered more resistant to the ingress of soft rot bacteria and can be preserved during shipment, as well as during storage, for relatively great periods of time.

It should be noted that the heated air forced through the chamber 10 may be of any suitable predetermined velocity for the purpose intended, although I have found that an air velocity of from between 1000 to 1200 feet per minute gives the desired results.

As a matter of fact, the relative relation of the various factors, such as temperature, velocity, time, etc., may be computed mathematically as I have disclosed in my copending application Serial No. 347,139.

In Figures 5, 6, and 7, I have illustrated a modification of my invention, and wherein Figure 5 constitutes a cross sectional view of one end of a modified form or heating chamber and Figure 6 constitutes a view of the other end. In this form of the invention, the elongated chamber or tunnel 10' has a potato inlet 22' and a potato outlet 23', which are connected by a conveyor 20' of the same characteristics as the conveyor 20. As in the other form of my invention, the air inlet is disposed at the potato discharge side of the tunnel as indicated at 45'. This inlet is provided with an air heating coil 46' of any suitable construction.

Air is drawn through the opening 45' and over the heating coil 46' by a blower 42', which, like the blower 42, has an inlet 44' with a flared discharge mouthpiece 47'. This form of the invention differs in one respect from the previous described one in that the blower 42' has positioned adjacent it another blower 75 which has an air inlet 76 and a flared discharge mouthpiece 77 positioned alongside of the discharge mouthpiece 47' of the blower 42'. I have illustrated by arrows the flow of the air when these two blowers are functioning together. The blowers may be operated by any suitable means, such, for example, as motors or the like, which do not per se constitute part of this invention. This arrangement is such that the heated air has imparted to it the proper velocity to cause it to travel through the heating chamber without becoming unduly saturated with moisture.

Also positioned at spaced intervals along the length of the tunnel or chamber 10' are a plurality of fans 55', the construction of which is very similar to that of the fans 55 of the first described form of the invention, with the principal exception that the fan 55' includes as a component thereof an electric motor 79 and is disposed in an angular or inclined position in the chamber.

Each of these fan units 55' is arranged in a plane inclined relative to the horizontal or, in other words, relative to the horizontally extending conveyor 20'.

In order to further assist the directing of the air in an inclined direction and downwardly against the edibles on top of the conveyor 20', as well as through the conveyor, there is provided a baffle plate 80 which is disposed at the forward end of the fan unit 55'. This baffle is likewise inclined and, as illustrated, is disposed at substantially right angles to the normal plane of the fan assembly.

The operation of this form of my invention is substantially the same as the previous one, with the exception of the changes in the arrangement of the blowers and fans noted and described hereinabove. Also depending upon such variables as relative humidity, size and character of potatoes, outside air temperatures, etc., the time, temperature, and air velocity factors may be varied. However, the maximum temperature used must be less than that which would effect cooking of the main starchy body of the potato. I have in practice depending upon the variables noted, used heated air having a temperature varying from about 90° F. to 180° F.

I claim as my invention:

1. In an apparatus for treating potatoes to aid in preventing soft rot, means for conveying the potatoes through a predefined area, said area including a single length longitudinal path, air impelling means including a blower for subjecting the potatoes in said area to a blast of air of relatively high velocity, means for heating said air to a temperature in excess of 100° F. and short of that which would cook the potatoes to evaporate the moisture from the skins of the potatoes by skin drying the potatoes, and additional impelling means for directing said heated air in a longitudinal undulating movement to and about the potatoes being conveyed whereby to retard the passage of the air through the path and to increase the duration thereof in the path and whereby the evaporation of moisture from the potatoes is utilized to preclude undue heating of the starchy body thereof while the heat acts upon the outer cells of the potatoes as they are dried, said impelling means moving the air through said area in an opposite direction to that in which the potatoes are conveyed by said conveying means so that said potatoes are subjected to the hottest air at the potato discharge end of the area.

2. In an apparatus for treating potatoes to aid in preventing deterioration while preserving the natural appearance of the potatoes, means for conveying the potatoes through a predetermined area comprising a single longitudinal path, means for impelling air into and through said area to subject each potato uniformly over its entire surface to a volume of air, means in advance of said impelling means for heating said air to a temperature approximating 100° F., and additional means for deflecting the air up and down relative to said path to preclude direct passage of the heated air through the path and to increase its duration therein and its contact with the potatoes so as to remove rapidly moisture from the outer cells of the potatoes, said impelling means subjecting the potatoes just prior to their discharge from said area to a high temperature short of that which would cook the potatoes but which will act on the outer cells of the potatoes to render the same resistant to the ingress of deteriorating bacteria.

3. In an apparatus for treating potatoes to aid in preventing deterioration while preserving the natural appearance of the potatoes, a single length tunnel, a single length conveying means for conveying the potatoes through said tunnel, means for impelling air through said tunnel at a velocity of from 1000 to 1200 feet per minute, means for heating said air to a temperature approximating 100° F. and short of that which would cook the potatoes to remove rapidly moisture from the outer cells of the potatoes, and additional means for deflecting the path of said heated air so as to force it to assume an undulating movement through the tunnel to increase the duration of the air therein, said flowing heated air being in such direction as to subject the potatoes just prior to the discharge thereof from the tunnel to a high temperature short of that which would cook the potatoes but which will act on the outer cells thereof to render the same resistant to ingress of deteriorating bacteria.

ALEXANDER F. ARTHUR.

Disclaimer 2,326,115.—*Alexander F. Arthur*, Homestead, Fla. POTATO DRYING APPARATUS. Patent dated Aug. 10, 1943. Disclaimer filed Mar. 21, 1950, by the assignee, *Frederick C. Peters*.

Hereby enters this disclaimer to claim 3 of said patent.
[*Official Gazette April 18, 1950.*]